United States Patent [19]
Peters

[11] Patent Number: 5,322,599
[45] Date of Patent: Jun. 21, 1994

[54] SHAPED-TUBE ELECTROLYTIC MACHINING PROCESS

[75] Inventor: W. Neil Peters, Corning, N.Y.
[73] Assignee: Corning Incorporated, Corning, N.Y.
[21] Appl. No.: 5,568
[22] Filed: Jan. 19, 1993
[51] Int. Cl.$^5$ .................. B23H 3/02; B23H 3/10; B23H 9/14
[52] U.S. Cl. .................. 204/129.2; 204/129.43; 204/129.55; 204/129.75
[58] Field of Search .......... 204/129.1, 129.35, 129.55, 204/129.75, 129.5, 284, 290 R, 237–238, 129.2

[56] References Cited

U.S. PATENT DOCUMENTS

| | | | |
|---|---|---|---|
| 3,278,411 | 10/1966 | Williams | 204/284 X |
| 3,352,770 | 11/1967 | Crawford et al. | 204/129.7 |
| 3,352,958 | 11/1967 | Andrews | 264/255 |
| 3,421,997 | 1/1969 | Williams | 204/284 |
| 3,696,014 | 10/1972 | Goodard et al. | 204/284 X |
| 3,793,169 | 2/1974 | Joslin | 204/129.55 |
| 3,803,015 | 4/1974 | Andrews | 204/224 M |
| 4,088,557 | 5/1978 | Andrews | 204/224 M |
| 4,430,180 | 2/1984 | Shimizu | 204/129.55 |
| 4,687,563 | 8/1987 | Hayes | 204/224 M |

FOREIGN PATENT DOCUMENTS 0245545 12/1986 European Pat. Off.

OTHER PUBLICATIONS

*Machining Data Book*, vol. 2, pp. 11–71 to 11–75 (3rd ed. 1980).
E. J. Weller, *Nontraditional Machining Processes*, pp. 109–113 (2nd ed. 1984).
G. F. Benedict, *Nontraditional Manufacturing Processes*, pp. 181–187 (1987).

*Primary Examiner*—Donald R. Valentine
*Attorney, Agent, or Firm*—Gunnar Leinberg; Kees van der Sterre

[57] ABSTRACT

A process of electrolytic machining holes of uniform diameter in a conductive workpiece, particularly one having a slotted lower portion. Drilling is accomplished electrochemically by providing a conductive tube, passing an electrolytic fluid through the tube to the workpiece, and passing a DC current between the tube and the workpiece through the electrolyte. The DC current causes material from the workpiece to "deplate" into the electrolyte, resulting in the formation of the hole. Hole diameter is made uniform by maintaining the supplied DC current constant, despite sudden changes in the conductivity of the electrolyte, the workpiece or both.

21 Claims, 6 Drawing Sheets

FIG. 6  HOLE DIAMETER AT BREAKTHROUGH
Die Number 65140

FIG. 7  HOLE DIAMETER AT BREAKTHROUGH
Die Number 65141

FIG. 8 HOLE DIAMETER AT BREAKTHROUGH
Die Number 65139

FIG. 9 HOLE DIAMETER AT BREAKTHROUGH
Die Number 65137

FIG. 10  HOLE DIAMETER AT BREAKTHROUGH
Die Number 65134

FIG. 11  HOLE DIAMETER AT BREAKTHROUGH
Die Number 65136

SHAPED-TUBE ELECTROLYTIC MACHINING PROCESS

FIELD OF THE INVENTION

The present invention relates to a shaped-tube electrolytic machining process.

BACKGROUND OF THE INVENTION

Electrochemical machining is a widely used technique for producing holes in difficult-to-machine conductive parts. Generally, this technique involves using electrochemical force (as opposed to mechanical force) to disengage or deplate material from a workpiece.

A highly specialized adaptation of electrochemical machining, known as shaped-tube electrolytic machining, is used for drilling small, deep holes in electrically conductive materials. Shaped-tube electrolytic machining is a noncontact electrochemical-drilling process that distinguishes itself from all other drilling processes by its ability to produce holes with aspect ratios of up to 300:1. Shaped-tube electrolytic machining processes are discussed in more detail in *Machining Data Book*, vol. 2, pp. 11-71 to 11-75 (3rd ed. 1980); E. J. Weller, *Nontraditional Machining Processes*, pp. 109-13 (2nd ed. 1984); and G. F. Benedict, *Nontraditional Manufacturing Processes*, pp. 181-87 (1987).

Advances in jet engine technology have resulted in the need to machine super alloys and metals. The characteristics of these metals and the complex designs associated with jet engine hardware have posed machining problems which are beyond the capability of conventional machining processes. As a result, shaped-tube electrolytic machining processes have found particular applicability in the manufacture of aircraft engines. These processes are especially useful in drilling holes through turbine blades, buckets, vanes, and struts so that cooling liquid can be circulated through these components during turbine operation. Examples of the use of shaped-tube electrolytic machining processes in conjunction with aircraft engine manufacture are disclosed in U.S. Pat. No. 3,352,770 to Crawford et al., U.S. Pat. No. 3,352,958 to Andrews, U.S. Pat. No. 3,793,169 to Joslin, U.S. Pat. No. 3,805,015 to Andrews, and U.S. Pat. No. 4,088,557 to Andrews.

In recent years, shaped-tube electrolytic machining processes have also found application in the manufacture of precision extrusion dies for producing ceramic honeycomb structures. Such structures are particularly useful for automobile catalytic converters.

The manufacture of extrusion dies from these ultrahard materials is an extremely precise process. The extrusion dies are formed with multiple apertures through which material to be extruded is forced under high pressure. In one method of forming the extrusion die, mechanical drills are used to provide the extrusion apertures. If the extrusion dies are formed of ultra-hard materials such as, for example, 17-4PH stainless steel or Inconel ® 718 (a registered trademark of International Nickel Co., Inc.), the drilling rate used for aperture formation is very slow and a great deal of time and effort is expended in extrusion die formation. If softer die materials are used, the drilling rate is increased, but the life span of the resulting extrusion die is correspondingly shorter.

Because of these difficulties, apertures are now formed in extrusion dies by electrochemical machining techniques rather than mechanical drilling. With an electrochemical machining process, the workpiece from which the die is to be formed is situated in a fixed position relative to a movable manifold. The manifold supports a plurality of drilling tubes, each of which are utilized to form an aperture in the workpiece. The drilling tubes operate as cathodes in the electrochemical machining process, while the workpiece comprises the anode. As the workpiece is flooded with an acid electrolyte from the drilling tubes, material is selectively deplated from the workpiece in the vicinity of the drilling tubes to form the requisite aperture pattern. U.S. Pat. No. 4,687,563 to Hayes and European Patent Application Publication No. 0245 545 to Peters disclose such processes.

A further difficulty in drilling holes in ultrahard materials arises when a series of workpieces is drilled using the same electrolytic fluid. As conductive material deplates from the workpiece and accumulates in the fluid, the fluid's conductivity changes, and, for a given applied voltage in the drilling process, the resultant current flow through the workpiece will vary. As current changes, hole diameter changes accordingly. This problem must be overcome by continuously readjusting input voltage to achieve a uniform hole diameter.

U.S. Pat. No. 3,793,169 to Joslin describes a process for drilling holes of substantially uniform diameter at a high drilling feed rate. To achieve a uniform hole diameter, Joslin teaches slightly reducing supplied current as the depth of the hole increases. Current reduction is accomplished by "programming" a decrease in current as hole depth increases, without regard to actual current flows or conductivity levels. At best, this method for attaining uniform hole diameter is imprecise.

A further problem arises when the workpiece to be drilled includes a slotted lower surface, in the form of a grid of intersecting slots, as is the case in many drilling operations. Holes typically are drilled to meet the intersection of the slots. In such workpieces, resultant hole diameter is reduced as the hole reaches the slotted portion. Such reduced hole diameter is caused by a reduction in the electrolyte back pressure experienced as the holes break into the slotted areas. As the hole being drilled reaches the intersection of slots, electrolyte flows through the slots and back through previously drilled holes, resulting in a loss of electrolyte in the subject hole. This loss of back pressure causes a reduction of the current path, and a consequent reduction of current flow. The reduced current flow slows the deplating rate, which causes the hole diameter to taper where the hole meets the slot. A reduced hole diameter is undesirable at the interface between a hole and slot because it can cause inconsistencies in material flow through a die produced from the workpiece.

The present invention is directed to overcoming these deficiencies.

SUMMARY OF THE INVENTION

The present invention relates to a process for shaped-tube electrolytic drilling of holes in workpieces, particularly those having slotted lower portions. The process involves advancing a conductive tube toward the workpiece while both passing an electrolyte through the tube and into contact with the workpiece and passing a fixed electric current between the tube and the workpiece through the electrolyte. The constant current flow through the tube, the fluid, and the workpiece causes conductive material from the workpiece to deplate uniformly throughout the hole.

DETAILED DESCRIPTION OF THE DRAWINGS AND THE INVENTION

Figure 1:
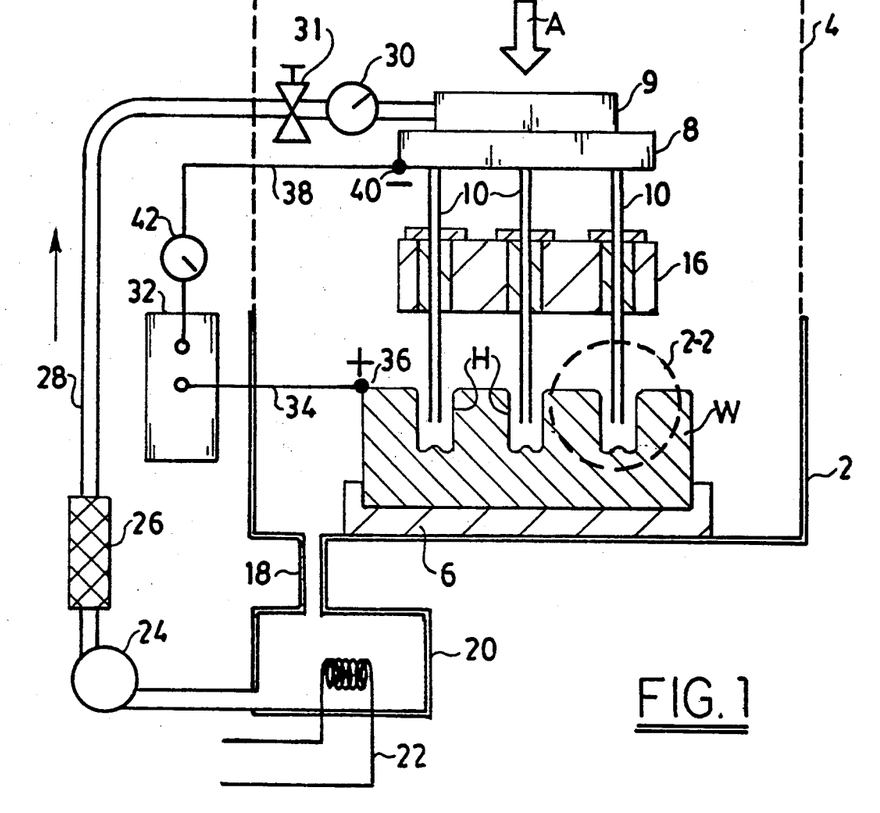
FIG. 1 is a schematic view of a shaped-tube electrolytic machining system.

FIG. 1 is a schematic view of a shaped-tube electrolytic machining system which is useful for carrying out the drilling process of the present invention. The system includes a work enclosure formed by base 2 and cover 4. Positioned within the work enclosure is support 6 on which workpiece W rests. Workpiece W includes slots S in the lower surface thereof. As illustrated, holes H are drilled in workpiece W by passing an electrolyte through feed manifold 9 into hollow tube electrodes 10. To achieve electrolytic machining, electrode holder 8 is provided with cathode contact 40 which is coupled to constant current source 32 by connector 38, having ammeter 42. Workpiece W is provided with anode contact 36 which is coupled to constant current source 32 by connector 34. As a result, electrolyte E discharged through hollow tube electrodes 10 deplates metal from workpiece W, forming holes H. This is shown in more detail in FIG. 2, which is an enlarged view of the portion of the system of FIG. 1 taken within circle 2—2. As illustrated, electrolyte E advances through the central passage defined by hollow tube electrode 10. At end 13 of hollow tube electrode 10, electrolyte E contacts workpiece W which increases the depth of hole H. Electrolyte E then advances upwardly out of hole H as shown by the arrows in FIG. 2. This flow of electrolyte E causes metal deplated from workpiece W within hole H to be carried out of the hole. In FIG. 1, stationary guideplate 16 is provided to align hollow tube electrodes 10 so that holes H in workpiece W are properly located.

Figure 2:
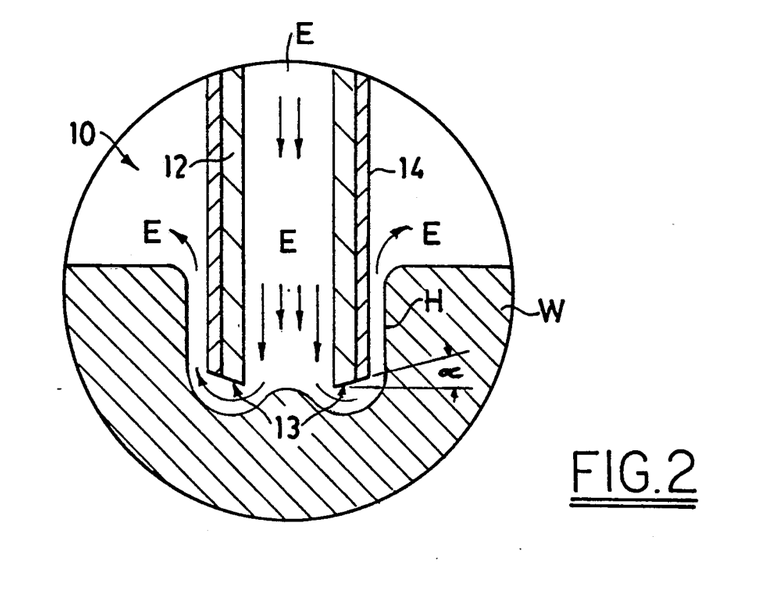
FIG. 2 is an enlarged view of a portion of the system of FIG. 1 taken within circle 2—2 of FIG. 1.

As also shown in FIG. 2, hollow tube electrode 10 includes metal tube 12 and a coating of dielectric material 14. End 13 of metal tube 12 is, however, not covered by dielectric material so that an electrolytic cell is formed between that portion of metal tube 12 and workpiece W. Generally, this portion of hollow tube electrode 10 is sloped such that angle α is preferably 11°. By coating metal tube 12 with dielectric material 14, metal ions present in electrolyte E after removal from workpiece W are prevented from depositing on hollow tube electrode 10 where it is coated. This coating also confines drilling to the area around end 13 of metal tube 12. Deposition can take place on hollow tube electrode 10 only where metal tube 12 is not coated with dielectric material 14. However, any deposits can be removed by periodically reversing the polarity of constant current source 32. Such polarity reversal of constant current source 32 is typically carried out for 0.05 to 3.0 sec. after 0.1–30 sec. of operation by hollow tube electrode 10.

Electrolyte E exiting from holes H in workpiece W drains into supply tank 20. Supply tank 20 is provided with heat exchanger 22 which heats or cools the electrolyte to maintain a desired temperature. Pump 24 is connected to supply tank 20 for recycling electrolyte through filter 26, feedpipe 28, pressure controller 31, and flow meter 30 into manifold 9.

In operation, the shaped-tube electrolytic machining system shown in FIG. 1 circulates electrolyte through the system until holes H of sufficient depth are formed in workpiece W. As hole H deepens, the structure formed by manifold 9, electrode holder 8, and hollow tube electrodes 10 is advanced toward workpiece W in the direction of arrow A by a constant feed servosystem (not shown). As a result, ends 13 of hollow tube electrodes 10 are maintained in a position suitable for optimal deplating of metal from workpiece W. Generally, the rate at which these components are advanced along the path defined by arrow A is substantially equal to the rate at which the workpiece material is dissolved. The system of FIG. 1 is provided with a mechanism (not shown), as is well known in the art, to control operation of constant current source 32, the constant feed servosystem and the electrolyte circulating system.

The shaped-tube electrolytic machining process of the present invention can be used to drill holes in a variety of conductive materials, such as 304 stainless steel, 321 stainless steel, 414 stainless steel, inconel alloy 718, inconel alloy 625, inconel alloy X-750, and inconel alloy 825. Holes as deep as 610 millimeters can be produced with length-to-diameter (i.e. aspect) ratios of up to 300:1 and diameters ranging from 0.5 to 6.4 millimeters. Oval and other shapes should have a minimum width of 0.5 millimeters and a major-to-minor axis ratio of 3:1.

The electrolyte is a solution which contains an acid selected from the group consisting of nitric acid, sulfuric acid, hydrochloric acid, and mixtures thereof. Generally, the electrolyte has a volumetric acid concentration of 16–18 vol. %. The electrolyte is applied to workpiece W at a temperature of 18°–32° C. due to the effect of heat exchanger 22 and at a pressure of 344–551 KPA which is imparted by the discharge pressure from pump 24, as regulated by pressure controller 31. The content of metal particles in the electrolyte is a maximum of 45–2500 milligrams per liter. Generally, conductivity increases with the concentration of metal and acid in the electrolyte. Higher acid concentrations result in increased metal removal from workpieces; however, accelerated chemical attack on the electrodes may occur. Increased concentration of acid in the electrolyte also increases the hole size. Increases in electrolyte temperature have the same effect as concentration increases.

Figure 3:
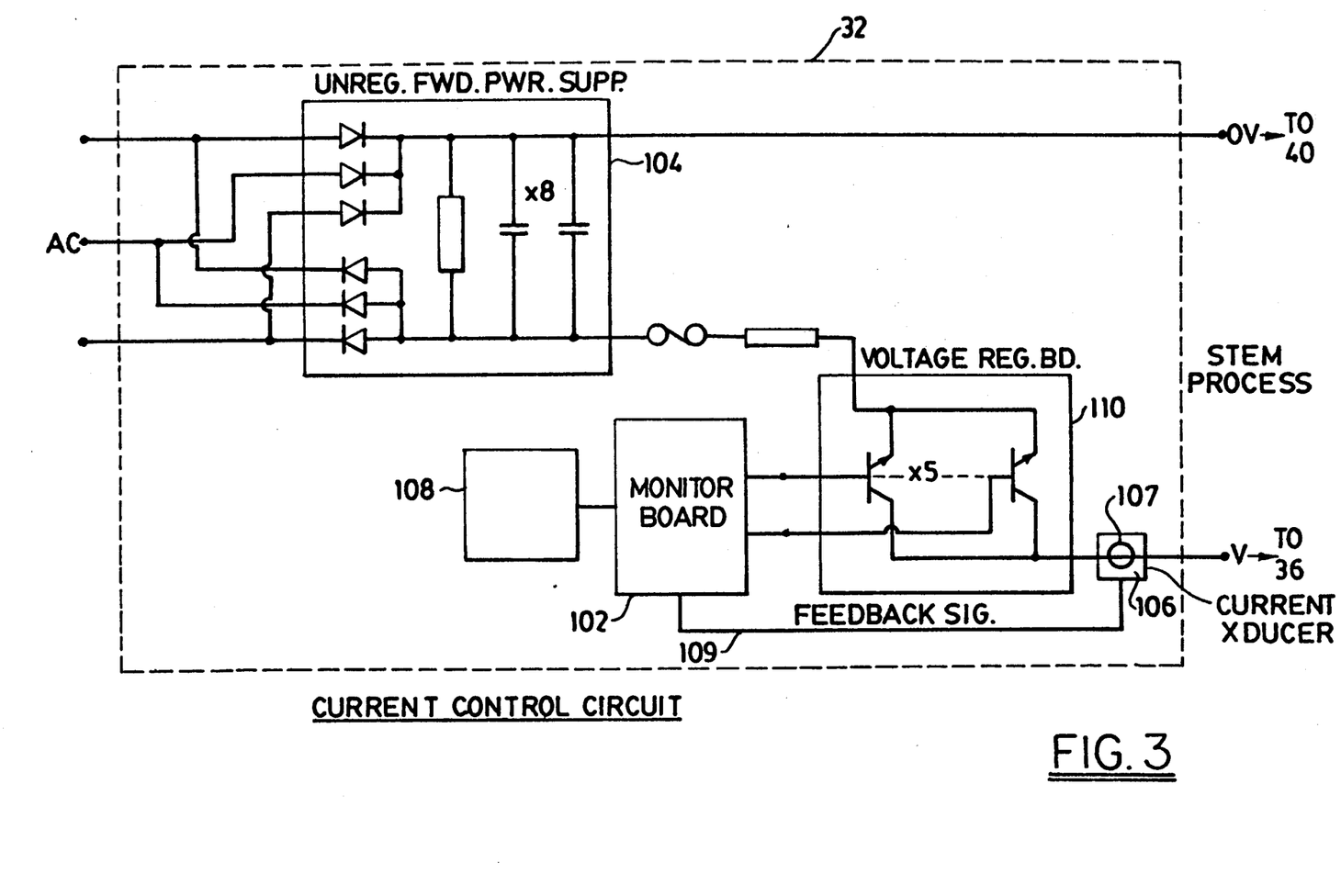
FIG. 3 is a schematic diagram of a preferred constant current device used to carry out the present invention.

Constant current source 32 is preferably a direct current power supply. It has a voltage of 1–15 volts, a forward on time of 0.1–30 seconds, and a reverse time of 0.05–3 seconds. A preferred current value during drilling is approximately 166 Amps, and an acceptable range of current has been found to be 160–170 Amps. Generally, the cross-sectional area of the hole being drilled becomes larger as current increases. However, it is not desirable to operate at the upper limit of the voltage range, because the resulting heat generated may damage the coating of dielectric material 14 and will accelerate the build up of metal ions on the electrode.

FIG. 3 is a detailed drawing of a preferred embodiment of constant current power supply 32. Unregulated forward power supply 104 converts supplied three-phase AC voltage to a DC signal. This type of power supply, which rectifies the AC input signal to a DC signal, is well known in the art, and any such rectifier can be used to carry out the present invention. The rectified power signal is applied to the drilling apparatus at contact 40. Current transducer 106, connected to the workpiece W at contact 36, senses DC current flow exiting the circuit consisting of the hollow tube electrodes, electrolyte, and workpiece, and generates a proportional output signal when a change of current is detected. The output signal is induced by passing the DC supply current through a magnetic flux field which will result in an induced voltage should current change. The principle upon which the transducer operates is the Hall effect which is well known in the art. Such transducers are also well-known in the art and consist of a substantially torroidal permanent magnet 107, through which the current-carrying conductor passes. The generated feedback signal is proportional to the change in current, and is applied via feedback line 109 to a monitor board 102, which preferably includes one or more operational amplifiers (not shown) for generating difference signals in response to system current changes sensed by current transducer 106.

To set the constant current level of the system, an operator enters a desired level into computer 108 via a keyboard (not shown). Computer 108, is any computer that can be programmed to deliver a correction signal in response to a signal representing a change in current flow. The computer will generate a reference signal proportional to the desired current, the reference signal being applied to the monitor board 102. The feedback signal from the current transducer 106 and the fixed signal supplied by computer 108 each are applied to an input of a single operational amplifier on monitor board 102. Differences in the two signals trigger the operational amplifier to generate an output signal to be applied to the voltage regulator 110. The difference signal is used to activate or deactivate one or more transistors in the voltage regulator 110 and change the applied current. Voltage regulation board 110 preferably includes five emitter-follower transistors which can be selectively actuated by output signals from monitor board 102 to adjust input voltage and, therefore, DC current flow through the electrode, the electrolyte, and the workpiece.

To summarize, the problem of inconsistent hole diameter resulting from sudden supply current changes as the holes reach the slotted portions of the workpiece is solved by controlling DC current in accordance with the present invention. Specifically, DC current is maintained at a constant level despite sudden changes in conductivity resulting from loss of electrolyte as slots are encountered. As a reduction in current flow is sensed, input voltage is automatically adjusted upward to restore current flow to an desired level.

Hollow tube electrodes 10 are generally fabricated from titanium because of its resistance to electrolytic action. The layer of dielectric material 14 must be smooth, have an even thickness, be concentric with the tube, be tightly adhered to metal tube 12, and be free of pin holes or foreign material. Straightness is essential to achieve satisfactory hole quality. Suitable dielectric materials include polyethylene, polytetrafluoroethylene, ceramics, and rubbers. A particularly preferred dielectric coating material is ALKANEX TM.

Holes are formed in a solid workpiece (having slots in the bottom surface thereof) like that of workpiece W in FIG. 1 by the process described above. After holes H of suitable length are formed in workpiece W, a constant feed servosystem (not shown) withdraws the portion of the apparatus constituted by feed manifold 9, electrode holder 8, and hollow tube electrodes 10 away from workpiece W and out of holes H. Generally, holes H extend through workpiece W. As a result of the drilling process, holes H have a surface roughness of 0.8–1.0 m. This is accomplished with a drilling speed (i.e., a rate at which hollow tube electrodes 10 advance into holes H) of 0.4–5.0 mm per minute.

As stated previously, as deplated material accumulates in the electrolyte, the conductivity of the electrolyte increases accordingly. This change in conductivity results in a decrease in DC current flow through the tube, the electrolyte and the workpiece for a given applied voltage. To maintain uniformity in hole diameter from workpiece to workpiece, the current must be kept constant, and the applied voltage raised for each successive workpiece drilling operation. In a preferred embodiment, the applied DC voltages for a series of four successive workpieces are as follows:

First workpiece drilled: 8.3 to 8.5 V
Second workpiece drilled: 8.6 to 8.8 V
Third workpiece drilled: 8.8 to 9.0 V
Fourth workpiece drilled: 9.0 to 9.2 V By upwardly adjusting supply voltage as conductivity decreases, drilling can be accomplished under identical conditions from workpiece to workpiece.

EXAMPLES

Example 1

Figure 4:
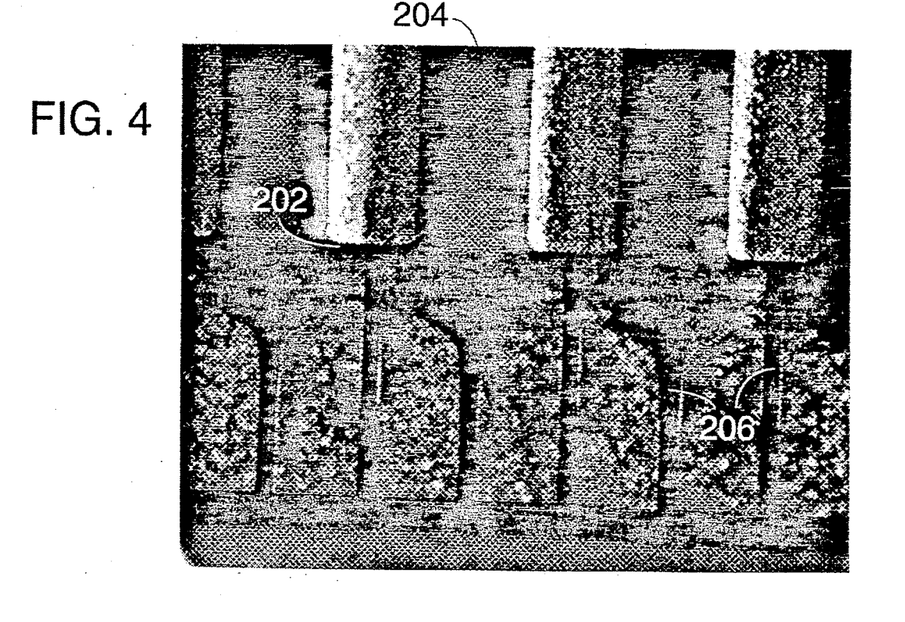
FIG. 4 is a magnified (15×) photographic view of holes drilled with a constant DC voltage.

Two pieces of 6.35 mm×29.083 mm×203.2 mm USN #S45000 stainless steel were clamped together for drilling with a shaped-tube electrolytic machining apparatus generally like that shown in FIG. 1. Such drilling was carried out where the two pieces mate at a constant voltage of 9 volts, an electrode feed rate of 0.889 mm per minute, and an electrolyte pressure of 448 KPA. This was carried out by drilling 37 separate rows of 145 holes. After drilling was completed, the clamped pieces were separated, and the drilled holes photographed. FIG. 4 is one such photograph which has been enlarged by 15×. As this Figure shows, interface 202 between hole 204 and slot 206 has a smaller diameter than the remainder of hole 204. This narrowing can cause inconsistencies in the flow of materials during extrusion.

Example 2

Figure 6:
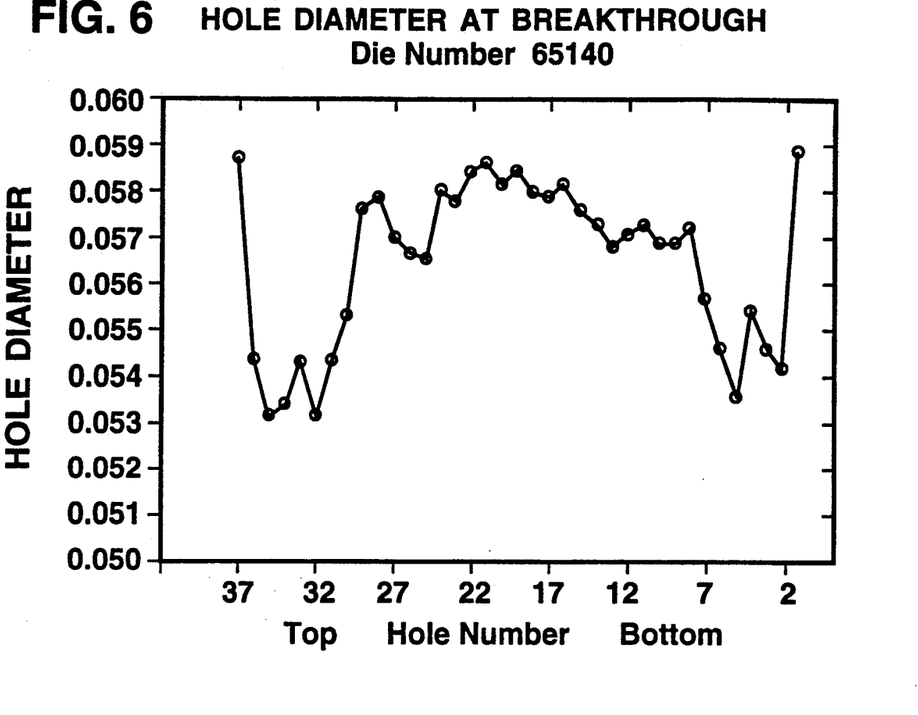
FIGS. 6–8 are plots of the average diameter, by row, of the holes drilled with a constant applied DC voltage where the holes interface with workpiece slots.

The procedure of Example 1 was repeated and the interface (i.e., 202) of all holes drilled was measured with the results for each row being averaged and plotted in FIG. 6. This Figure shows the wide variation in the sizes of the hole interfaces. In addition, FIG. 6 indicates that the initially drilled holes (i.e, holes 1, 37 and 19) have substantially the same area. However, the size of subsequent, proximately drilled holes have reduced areas, because previously drilled holes create a greater number of paths for electrolyte flow. For example, the electrolyte used to drill the holes in row 20 tends to flow through the slots and back up through the holes in row 19 when the holes in row 20 reach the slot at the lower portion of the workpiece. This reduces the current flow path and produces a smaller diameter at interface 202 in row 20.

Example 3

Figure 7:
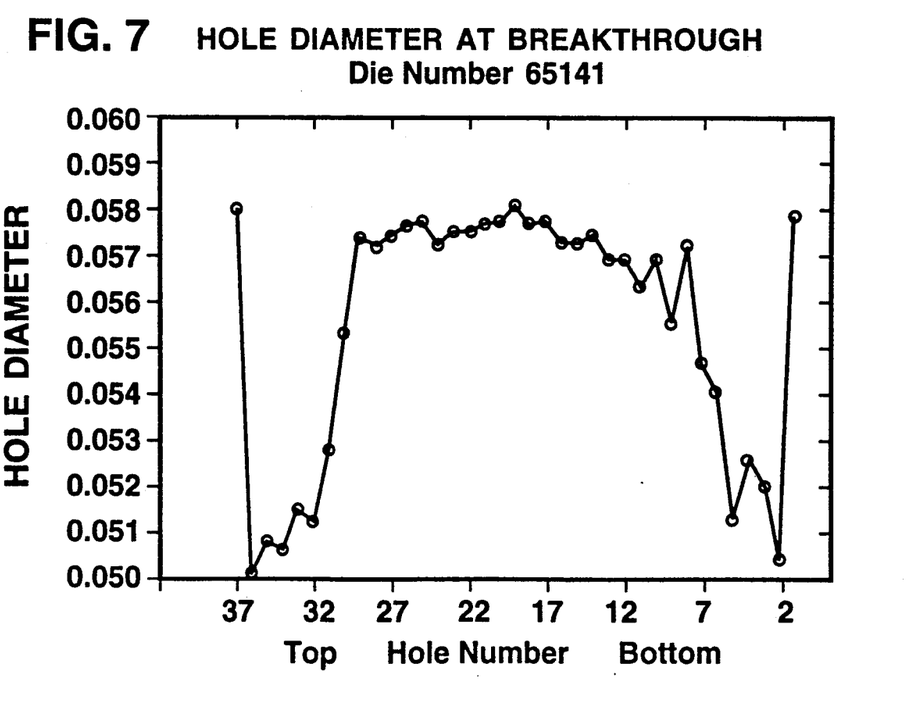

The procedure of Example 1 was repeated with the results for each row of holes being averaged and plotted, as shown in FIG. 7. This Figure showed that this example achieved substantially the same results as Example 2.

Example 4

Figure 8:
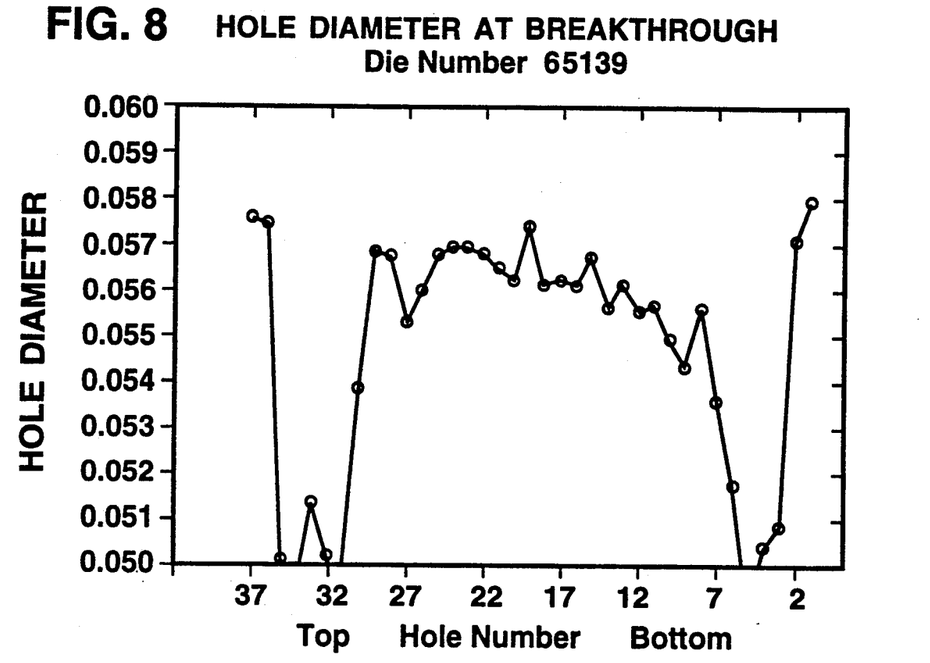

The procedure of Example 1 was repeated with the results for each row of holes being averaged and plotted, as shown in FIG. 8. This Figure shows that Example 4 achieved substantially the same results as Examples 2 and 3.

Example 5

The procedure of Example 1 was repeated except that it was carried out at a constant current of 166 amps (instead of a constant voltage as in Examples 1-4). The resulting drilled holes (enlarged by 15×) are shown in FIG. 5.

Figure 5:
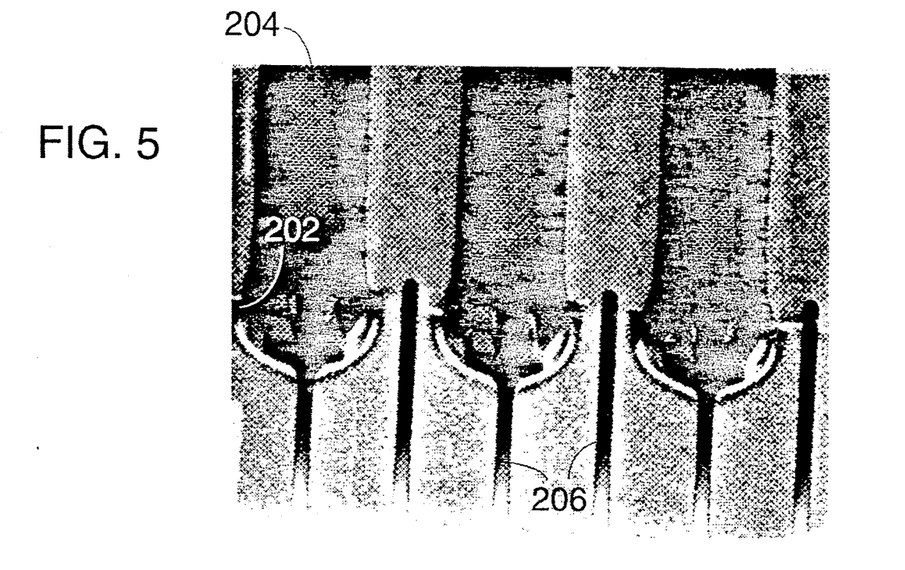
FIG. 5 is a magnified (15×) photographic view of holes drilled, in accordance with the present invention, with a constant applied DC current.

FIG. 5 shows that interface 202 is not smaller than hole 204 when constant current operation is utilized.

Example 6

Figure 9:
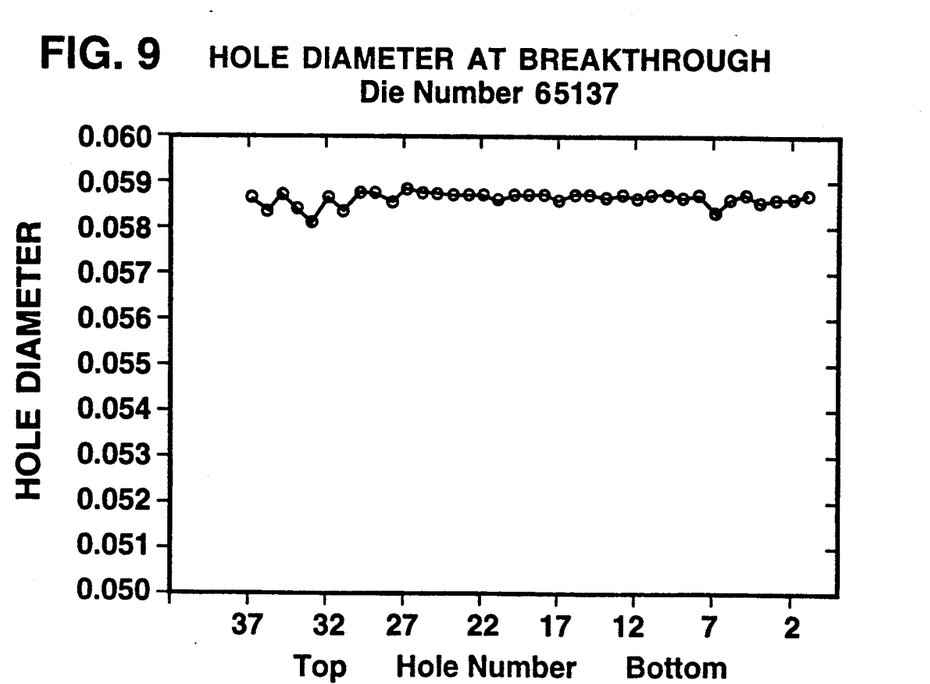
FIGS. 9–11 are plots of the average diameter, by row, of the holes drilled, in accordance with the present invention, with a constant DC current where the holes interface with workpiece slots.

The procedure of Example 5 was repeated and a plot of the average interface hole diameter, by row, was made, as shown in FIG. 9. FIG. 9 shows that the average interface diameter of the 37 rows of drilled holes is substantially uniform and that constant current operation does not encounter any adverse drilling sequence effect.

Example 7

Figure 10:
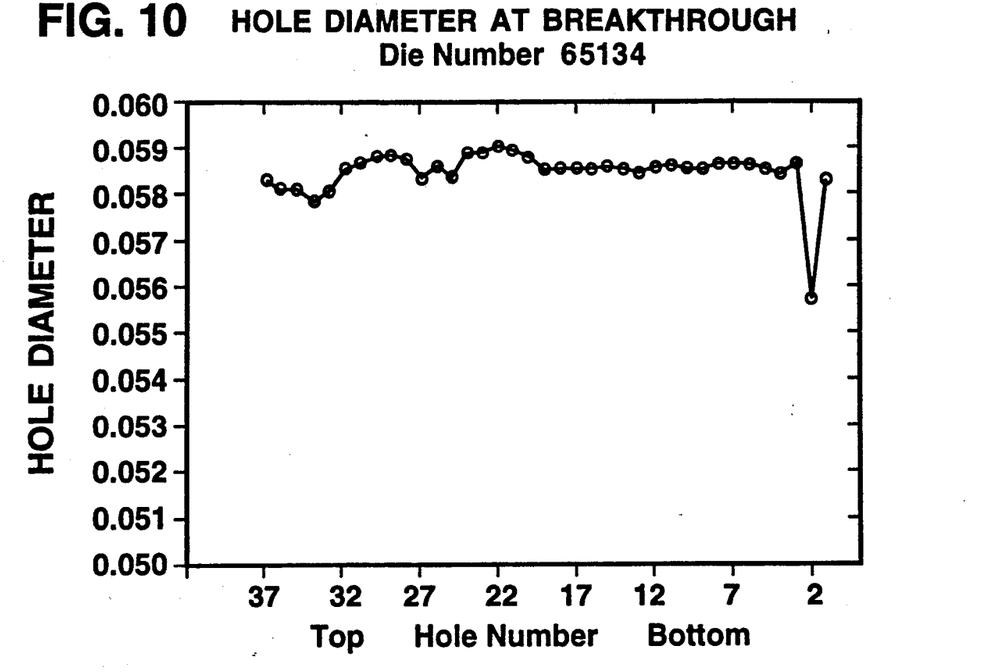

The procedure of Example 5 was repeated with a plot of the interface hole diameter for 37 rows of holes set forth in FIG. 10. This Figure shows that Example 7 achieved substantially the same results as Example 6.

Example 8

Figure 11:
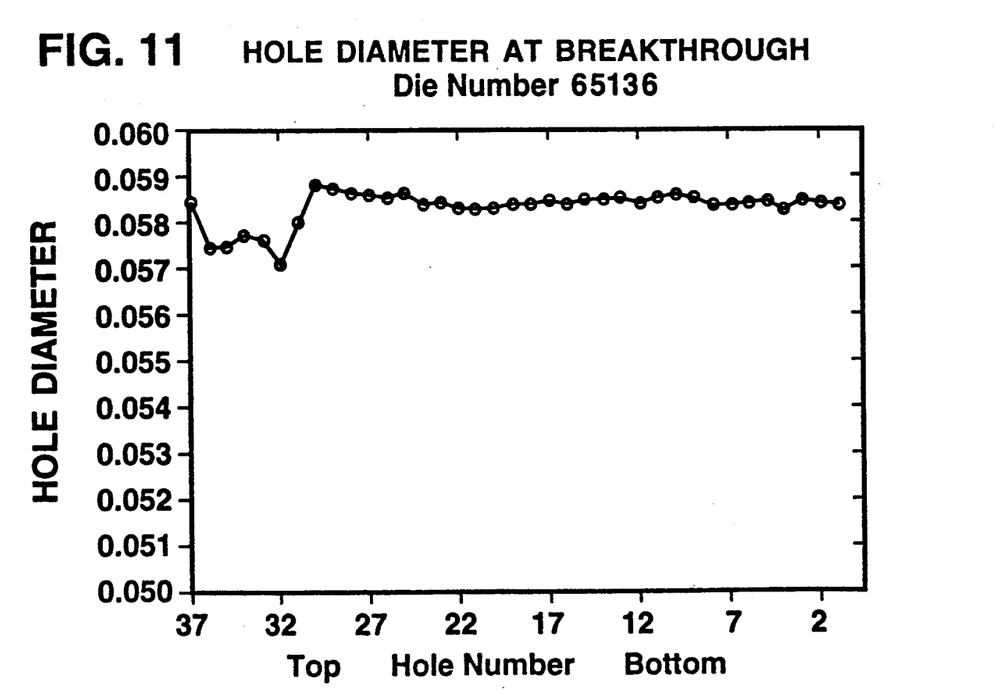

The procedure of Example 5 was repeated with a plot of the interface hole diameter for 37 rows of holes set forth in FIG. 11. This Figure shows that Example 8 achieved substantially the same results as Examples 6 and 7.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A shaped-tube electrolytic machining process for drilling a hole of uniform diameter in a conductive workpiece comprising:

drilling a hole in the workpiece by advancing a conductive tube toward the workpiece while passing an electrolyte through the tube into contact with the workpiece, passing a fixed electric current between the tube and the workpiece through the electrolyte and maintaining the fixed electric current by sensing the fixed electric current, comparing the sensed fixed electric current against a reference signal and adjusting the fixed electric current in response to the comparison, whereby conductive material from the workpiece is deplated uniformly throughout the hole.

2. A process according to claim 1, wherein the drilling speed is 0.4 to 5.0 mm/min.

3. A process according to claim 1, wherein the hole has a surface roughness of 0.8 to 1.0 m after said drilling.

4. A process according to claim 1, wherein the electrolyte contains an acid selected from the group consisting of nitric acid, sulfuric acid, hydrochloric acid, and mixtures thereof.

5. A process according to claim 4, wherein the electrolyte has a volumetric acid concentration of 16-18 vol. %.

6. A process according to claim 5, wherein the electrolyte has a temperature of 18°-32° C. during said drilling.

7. A process according to claim 1 further comprising:

reversing periodically the direction of the current during said drilling to prevent build-up of deplated conductive material on the tube.

8. A process according to claim 1, wherein the tube electrode is made of metal.

9. A process according to claim 8, wherein the metal tube is exteriorly coated with a dielectric material except at its end where the electrolyte is discharged against the workpiece.

10. A process according to claim 1, wherein the hole has a length to diameter ratio of up to 300:1.

11. A process according to claim 1 further comprising:

collecting the electrolyte after it has contacted the workpiece during said drilling.

12. A process according to claim 11 further comprising:

recycling the collected electrolyte to the metal tube electrode for reuse during said drilling.

13. A process according to claim 12 further comprising:

filtering the electrolyte during said recycling.

14. A process according to claim 1, further comprising:

simultaneously drilling a plurality of holes.

15. A process according to claim 14, wherein the finished workpiece has a hole configuration of an extrusion die suitable for use in extruding ceramic honeycomb materials.

16. A process according to claim 1, wherein the fixed electric current has a value of 160-170 amps.

17. A process according to claim 1, further comprising repeating said drilling on one or more additional workpieces using the same electrolyte.

18. A process according to claim 1, wherein the workpiece has slots on a surface distal from where said drilling is initiated and toward which the conductive tube is advanced.

19. A shaped-tube electrolytic machining process for drilling a hole of uniform diameter in a conductive workpiece comprising:

drilling a hole in the workpiece by advancing a conductive tube toward the workpiece while both passing an electrolyte through the tube and into contact with the workpiece and passing a fixed electric current between the tube and the workpiece through the electrolyte, whereby conductive material from the workpiece is deplated uniformly throughout the hole, wherein the fixed electric current has a valve of 160-170 amps.

20. A shaped-tube electrolytic machining process for drilling a hole of uniform diameter in a conductive workpiece comprising:
drilling a hole in the workpiece by advancing a conductive tube toward the workpiece while both passing an electrolyte through the tube and into contact with the workpiece and passing a fixed electric current between the tube and the workpiece through the electrolyte, whereby conductive material from the workpiece is deplated uniformly throughout the hole, wherein the workpiece has slots on a surface distal from where said drilling is initiated and toward which the conductive tube is advanced.

21. A shaped-tube electrolytic machining process for drilling a hole of uniform diameter in a conductive workpiece comprising:
drilling a hole in the workpiece by advancing a conductive tube toward the workpiece while passing an electrolyte through the tube and into contact with the workpiece and passing and maintaining a fixed electric current between the tube and the workpiece through the electrolyte, whereby conductive material from the workpiece is deplated uniformly throughout the hole; and
maintaining the fixed electric current by monitoring changes in the fixed electric current, comparing the monitored fixed electric current with a reference and adjusting the fixed electric current in response to the comparison.

* * * * *